United States Patent Office 3,268,624
Patented August 23, 1966

3,268,624
BLOCK COPOLYMERS OF ETHYLENE AND
PROPYLENE
James L. Jezl, Swarthmore, and Habet M. Khelghatian, Springfield, Pa., and Louise D. Hague, Wilmington, Del., assignors to Avisun Corporation, Philadelphia, Pa., a corporation of Delaware
No Drawing. Filed Nov. 29, 1962, Ser. No. 241,032
1 Claim. (Cl. 260—878)

This invention relates to a process for manufacturing block copolymers of ethylene and propylene having improved impact resistance and brittle points as compared to polypropylene alone.

We have found that such polymers may be prepared by initially contacting a first feed which may be propylene alone or propylene in admixture with a small quantity of ethylene, in solution in an inert hydrocarbon solvent, with a catalyst system consisting of titanium trichloride, an alkyl aluminum dihalide, and an alkoxy silane. After the polymerization has proceeded for a desired length of time, passage of the first feed to the reactor is discontinued, and a second feed, which may be ethylene, or a mixture of ethylene and propylene richer in ethylene than the first feed stream, is passed to the reactor, and polymerization is continued for a second period of time, after which the reaction is stopped by the addition of a polar material, such as an alcohol. Proceeding in this manner, a two-segment block polymer is produced, the first segment of which is polypropylene or a copolymer rich in propylene, and the second segment of which is polyethylene, or a copolymer richer in ethylene than the first segment. Alternatively, the two feeds may be alternated two or more times, yielding a polymer having three or more segments of varying ethylene content.

In carrying out block polymerization in accordance with the invention, the catalyst components are generally dissolved or suspended in an inert hydrocarbon solvent such as hexane, heptane, or octane, or mixtures thereof, in an appropriate reaction vessel equipped with means to agitate the contents thereof, in the absence of oxygen or moisture. The catalyst containing solvent is then usually brought to a temperature in the range of 25° C. to 150° C., preferably 60° C. to 80° C., and the olefin or mixture of olefins to be polymerized is then pressured into the reactor. Moderately elevated pressures, as from 20 p.s.i.g. to 500 p.s.i.g. are used in order to increase the amount of olefin dissolved in the solvent, and thus speed the reaction.

The aluminum component of the catalyst system of this invention may be any alkyl aluminum dihalide, such as ethyl aluminum dichloride, propyl aluminum dichloride, butyl aluminum dichloride, or the corresponding bromine or iodine analogues, as well as alkyl aluminum dihalides the alkyl radicals of which contain greater numbers of carbon atoms than those illustrated above. The silane component of the catalyst may be any alkoxy silane having the formula $R_1R_2R_3R_4Si$ in which R is an alkoxy radical and $R_2$, $R_3$, $R_4$ are alkoxy or hydrocarbon radicals, such as trimethylethoxysilane, diethyldiethoxysilane, tetramethoxysilane, tetraethoxysilane, or triphenylethoxysilane. The atomic ratio of aluminum to titanium in the catalyst system should be from about 0.2:1 to 10:1, preferably from 1:1 to 3:1. When using silanes containing one or two oxygen atoms, the atomic ratio of aluminum to oxygen should not be below 5:4 since at this ratio polymerization is quite slow, nor should this ratio go above 10:1. A practical working ratio lies in the range between about 5:4 to about 6:1. When using a silane having more than two oxygen atoms, the ratio of aluminum to total oxygen is somewhat different. It appears that the oxygens in excess of two do not coordinate readily with the alkyl aluminum dihalide, and may be considered to be inactive. In such cases the ratio of aluminum to total oxygen may be less than 5:4, but the ratio of aluminum to active oxygen should still be in the range of 5:4 to 10:1.

As previously stated, the initial feed to the reactor may be propylene alone, or it may be a mixture of propylene with a small amount of ethylene, the ratio of propylene to ethylene being preferably in the range of 98.5:1.5 to 95:5. The second feed may be ethylene alone, or it may be a mixture of propylene and ethylene. In any event, the quantities of the two feeds should be so adjusted that the ethylene content of the total product, including the soluble polymer formed in the reaction is from about 3% to about 20%. If desired, hydrogen may be added to either or both feeds in order to control the flow rate of the product. Flow rate is obtained by the procedure outlined in ASTM D1238–57T for obtaining the melt index of polyethylene, except that a temperature of 230° C. is used instead of 190° C.

In order that those skilled in the art may more fully appreciate the nature of this invention and the method for carrying it out, the following examples are given.

*Example I*

A water jacketed polymerization reactor was charged with n-hexane, titanium trichloride, ethyl aluminum dichloride, and ethyl orthosilicate in quantities such that the hexane contained 0.07 gram of titanium trichloride per 100 cc. and the mol ratio of ethyl aluminum dichloride to titanium trichloride to ethyl orthosilicate was 2:1:0.65. The reactor contents were brought to 160° F. Hydrogen was added to the reactor in an amount of 16.5 parts per million by weight based on the weight of the hexane. The reactor was then pressured with 75 p.s.i.g. propylene partial pressure. The total pressure was 81 p.s.i.g., 6 p.s.i.g. being due to hydrogen and hexane partial pressures. Polymerization started immediately and was continued for 94 minutes while maintaining the pressure at 81 p.s.i.g. Flow of propylene was then discontinued, and a mixture of 20% ethylene and 80% propylene was introduced into the reactor at a pressure of 81 p.s.i.g. Polymerization was continued for 196 minutes with this feed stock, after which the reaction was stopped by the addition of methanol. By material balance, it was calculated that the total product recovered from the reactor, which was 83% insoluble in boiling pentane, contained 4.8% ethylene. The product, which had a flow rate of 2.4, was molded into test pieces, and the brittle point was determined by ASTM D746–57T, and tensile impact by ASTM D1822–61T. The brittle point was −4.5° C. and the tensile impact was 44. Polypropylene having a flow rate of 2.4 has a brittle point of 13° C. and a tensile impact of 28.

*Example II*

The same catalyst and reaction conditions as in Example I were used. In this case, however, the initial feed was propylene, and polymerization was carried on for 25 minutes. Then ethylene alone was introduced for 4 minutes. This cycle was repeated four times, followed by polymerization of propylene alone for 9 minutes. The resultant polymer which was 89% insoluble in boiling pentane contained 3.4% ethylene, had a flow rate of 4.5, a brittle point of 4.5° C. and a tensile impact of 31. Polypropylene having this flow rate has a brittle point of 22° C. and a tensile impact of 17.

*Example III*

The procedure of Example II was followed, except that the initial feed stock was 3% ethylene and 97% propylene and the second was 26% ethylene and 74% propylene. The cycle of polymerization was first feed 31 minutes, second feed 18 minutes, first feed 5 minutes, second feed 13 minutes, first feed 3 minutes, second feed 13 minutes, first feed 6 minutes, second feed 23 minutes, and first feed 1 minute. The polymer, which was 75% insoluble in boiling pentane, contained 9.1% ethylene. The pentane-insoluble portion of the polymer had a flow rate of 2.1, a brittle point of −13.8 and a tensile impact of 66.6. Polypropylene of this flow rate has a brittle point of 13° C. and a tensile impact of 29.

*Example IV*

The procedure of Example III was followed, except that the second feed was 51% ethylene and 49% propylene. The polymerization times with each feed were adjusted to yield a polymer, 74% insoluble in boiling pentane, containing 5.7% ethylene. The flow rate of the pentane-insoluble portion of the polymer was 2.9, the brittle point −9.0° C., and the tensile impact was 68.9.

*Example V*

The data for this example was taken from a pilot plant run. The solvent, which was hexane, contained .0025 pound of TiCl₃ per gallon, and the mol ratio of AlEtCl₂ to TiCl₃ to ethyl silicate was 2:1:0.65. Propylene was first polymerized at 100 p.s.i.g. pressure for a period of three hours and 8 minutes, in the presence of 30 parts per million by weight based on the weight of the hexane, after which the pressure was reduced to 98 p.s.i.g., a total of 30 pounds being thus polymerized and the pressure was then raised back to 100 p.s.i.g. by the introduction of ethylene, and polymerization was continued for another one hour and ten minutes, while maintaining the pressure at 100 p.s.i.g. by the introduction of ethylene. The pentane-insoluble product recovered from the reaction had a flow rate of 5.0, a brittle point of −4.5° C., and a tensile impact strength of 48.5. Polypropylene of this flow rate has a brittle point of 23° C. and tensile impact strength of 16.

*Example VI*

A polymerization was carried out in accordance with the procedure of Example I. In this case the initial feed was 3% ethylene and 97% propylene, and polymerization was carried out for 14 minutes with this feed stock. After this time introduction of the propylene-rich feed was discontinued, the reactor was pressured with ethylene, and polymerization was continued for 3 minutes. Thereafter the first mix was again pressured into the reactor for 14 minutes, followed by ethylene for 3 minutes, followed by the mix for 17 minutes, followed by ethylene for 3 minutes, followed by the mix for 26 minutes, followed by ethylene for 7 minutes, followed by the mix for 26 minutes, followed by ethylene for 8 minutes, followed by the mix for 16 minutes, after which the reaction was killed by the addition of methanol. The solid reaction product had a flow rate of 3.3, a brittle point of −2° C., and a tensile impact strength of 46.

The invention claimed is:

A process for the preparation of block copolymers of ethylene and propylene which comprises contacting a first feed selected from the group consisting of propylene and mixtures of propylene and ethylene containing from about 1.5% to 5% ethylene, in an inert solvent with a catalyst system consisting of aluminum ethyl dichloride, titanium trichloride, and an alkoxy silane having the formula $$R_1R_2R_3R_4Si$$

wherein $R_1$ is an alkoxy radical and each $R_2$, $R_3$, and $R_4$ is an alkoxy radical or a hydrocarbon radical, the mol ratio of aluminum ethyl dichloride to titanium trichloride being in the range of 0.2 to 1 to 10 to 1, and the atomic ratio aluminum to active silane oxygen being in the range of 5:4 to 6:1, discontinuing the first feed, and contacting the catalyst system with a second feed selected from the group consisting of ethylene and mixtures of ethylene and propylene having a higher ethylene content than the first feed, and recovering a pentane-insoluble product having a lower brittle point and higher tensile impact strength than polypropylene of equivalent flow rate.

References Cited by the Examiner

UNITED STATES PATENTS

| | | | |
|---|---|---|---|
| 2,904,542 | 9/1959 | Fasce et al. | 269—94.9 |
| 2,943,063 | 6/1960 | Eby et al. | 260—94.9 |
| 3,048,574 | 8/1962 | Wiberg et al. | 260—94.9 |

FOREIGN PATENTS

| | | |
|---|---|---|
| 594,018 | 5/1959 | Italy. |
| 615,048 | 1/1961 | Italy. |

MURRAY TILLMAN, *Primary Examiner.*

WILBUR L. BASCOMB, Jr., *Examiner.*